2,982,690
INJECTABLE VETERINARY IRON COMPOSITIONS

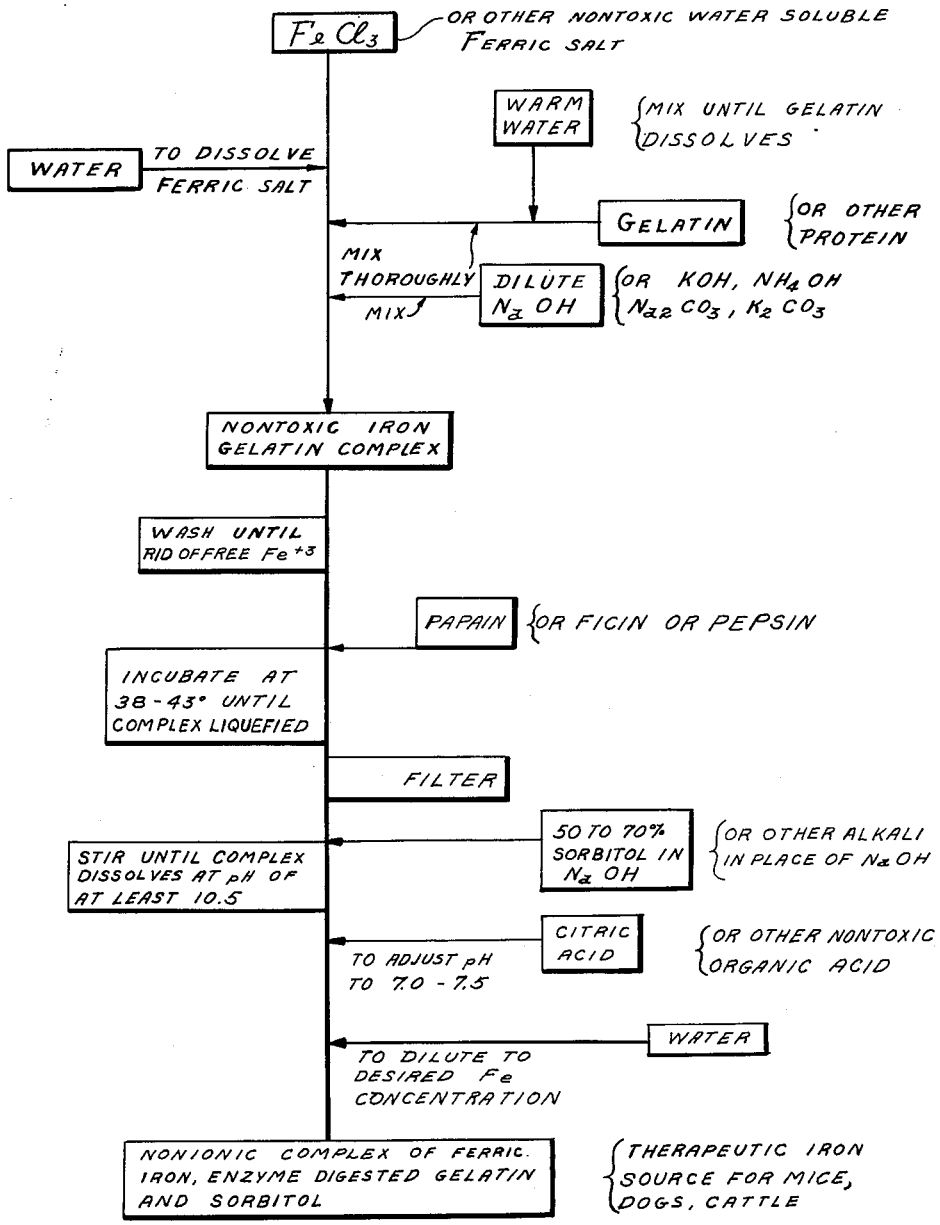

Karl A. Ratcliff, Des Moines, Iowa, assignor, by mesne assignments, to Diamond Laboratories, Des Moines, Iowa, a limited partnership Filed May 26, 1958, Ser. No. 737,484

9 Claims. (Cl. 167—68)

This invention relates to the manufacture of therapeutic preparations containing non-ionic iron in a form suitable for use in parenteral injection.

The use of the so-called saccharated iron oxide is well known for injection purposes in the treatment of iron-deficiency anemia and the like. Such preparations have the disadvantage of possible toxic effects, relatively strong alkalinity, inflammation at the site of injection and lack of absorption.

Recently it has been proposed to replace such saccharated iron oxide by a non-ionic ferric hydroxide-dextran complex. Dextran, however, is also a carbohydrate, being a polymer of sucrose. Moreover, in such process the dextran employed must be specially prepared by first polymerizing sucrose with the aid of appropriate microorganisms and then the dextran must be carefully depolymerized to a relatively narrow range of intrinsic viscosity.

It is an object of the present invention to prepare a composition containing substantially non-ionic iron for the treatment of iron-deficiency anemia which eliminates the disadvantages of the saccharated iron oxide and ferric hydroxide-dextran complexes recited above.

An additional object is to prepare a water soluble ferric hydroxide-enzyme digested protein complex which can be used to treat iron-deficiency anemia which is well tolerated and can be injected, e.g., either intramuscularly or intravenously, without undesirable side effects.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by enzyme digesting a ferric hydroxide-protein complex and then dissolving the digested complex in an aqueous alkaline solution of a pentitol or hexitol to form a water soluble non-ionic ferric hydroxide-enzyme digested protein complex. It is surprising that it is possible to dissolve the complex after digestion without destruction of the complex itself since normally it would be expected that digestion of the initial complex with enzyme would release the iron from the complex and return it to the ionic form.

A flow diagram of the process according to this invention is shown in the drawing.

The general procedure employed is as follows.

A non-toxic water soluble ferric salt, e.g., ferric chloride, ferric nitrate, ferric sulfate, ferric citrate, ferric ammonium sulfate or ferric acetate, in either hydrous or anhydrous form, is dissolved in deionized or distilled water.

There is then formed a solution of a protein such as gelatin, in water, e.g., by adding gelatin slowly to warm deionized or distilled water with constant mixing until completely dissolved or homogeneous.

The ferric salt solution and protein solution are mixed thoroughly. There is then slowly added a dilute solution of an alkali such as sodium hydroxide, potassium hydroxide, ammonium hydroxide, sodium carbonate or potassium carbonate with rapid mixing until a gelatinous iron complex is formed. A test sample is taken and checked for free ferric iron after a complete and thorough washing of the precipitated protein-iron complex, e.g., gelatin-ferric hydroxide complex.

When a negative free ferric iron test is obtained, the precipitated compound formed is mixed intimately with an enzyme such as papain, ficin, or pepsin. The mixture is then incubated for a time sufficient to liquefy or digest the protein complex. Generally, when the digestion is completed, an iron determination will indicate a concentration of Fe per cc. after concentration, preferably at least 55–60 mgs. Fe per cc. The product is filtered, e.g., through a Buechner funnel. To the filtered product, having a concentration of 55 to 60 mgs. of Fe per cc., is added an alkalinized solution of a pentitol or hexitol having a concentration of 50 to 70%, preferably about 70%, of the pentitol or hexitol. The alkaline pentitol or hexitol is made by adding an alkali to the polyhydric alcohol in an amount sufficient to give a pH of at least 12.

As the alkali, there can be used sodium hydroxide, potassium hydroxide, sodium carbonate or potassium carbonate. Generally, 15 to 20 cc. of 60% sodium hydroxide solution are used per 100 cc. of a 70% sorbitol solution.

Sorbitol is used as the polyhydric alcohol and this alkaline polyhydric alcohol is added to the protein-iron complex slowly with constant stirring until the iron is dissolved. This usually occurs when a pH of approximately 10.5 to 11 is reached.

The pH is then adjusted back to the desired value, e.g., a pH of 7.0 to 7.5, preferably approximately neutral, such as a pH of 7.2 to 7.3, using a saturated solution of citric acid or other non-toxic organic acid, e.g., gluconic acid.

The iron content of the solution is rechecked. Any additional ingredients which may be desired can be added at this point and then the solution diluted to the final concentration, filtered, if necessary, and sterilized in conventional fashion, e.g., using 10 lbs. per square inch steam pressure for 30 minutes, or by filtration through a suitable bacterial filter.

In testing a preparation according to the present invention for intramuscular toxicity in mice, I have not been able to inject quantities large enough to kill because of the limitations of quantity in intramuscular injections.

The protein-iron complex solutions of the present invention are non-toxic, can be injected parenterally, e.g., subcutaneously or intramuscularly, and are suitable for veterinary use for therapeutic purposes. They have been employed successfully, for example, with mice, dogs, and cattle.

Throughout the specification and claims unless otherwise indicated, all parts and percentages are by weight.

Example 4833.67 grams of ferric chloride were dissolved in 31,454.32 gms. of deionized water with constant mixing until solution was complete. 1500 grams of gelatin were slowly added to 6 gallons of warm (approximately 60° C.) deionized water with constant mixing until homogeneous.

The gelatin and ferric chloride solutions were then thoroughly admixed and immediately afterwards 3 gallons of 50% sodium hydroxide solution were added slowly with rapid mixing until a gelatinous iron complex was formed. The precipitated gelatinized iron was thoroughly washed with water and test samples were taken and checked for ionic ferric iron.

When a negative free ferric iron test was obtained, the product was intimately mixed with a 1% papain solution added at a ratio of 1 gm. papain to 2000 gms. of gelatinized iron complex. The mixture was incubated at 38 to 43° C. for at least 7 days to liquefy the gelatin complex. The mixture which had a concentration of about 55 mgs. Fe per cc. was filtered through a Buechner funnel.

To the filtered solution was added alkalinized 70% sorbitol with constant stirring until a pH of about 10.5 was reached. The alkaline sorbitol was prepared by adding 20 cc. of 60% sodium hydroxide solution to 100 cc. of 70% sorbitol solution.

The pH of the solution of the digested protein-complex was adjusted to 7.2 with a saturated solution of citric acid.

The solution was diluted with deionized water to give an iron concentration of 50 mgs. per cc., sterilized by filtration and was injected intravenously into mice.

What is claimed is:

1. A composition comprising a substantially non-ionic complex of ferric iron with an enzyme digested gelatin and sorbitol.

2. A composition according to claim 1 wherein the enzyme is selected from the group consisting of papain, ficin and pepsin.

3. A composition according to claim 1 wherein the enzyme is papain.

4. A veterinary process which comprises parenterally administering to an animal a therapeutic amount of a substantially non-ionic complex of ferric iron with an enzyme digested gelatin together with sorbitol.

5. A process according to claim 4 wherein the enzyme is papain.

6. The process of preparing a water soluble substantially non-ionic ferric iron enzyme digested gelatin complex which comprises digesting a ferric iron gelatin complex with an enzyme and adding an alkaline solution of sorbitol to said enzyme digested complex.

7. A process according to claim 6 wherein the enzyme is papain.

8. The process of preparing a water soluble substantially non-ionic ferric iron enzyme digested protein complex which comprises combining in water a water soluble ferric salt and gelatin, adding an alkali to precipitate a ferric iron gelatin complex, mixing said complex with papain, allowing said papain to act on said complex for a time sufficient to digest the complex, adding a strongly alkaline solution of sorbitol to said digested complex to dissolve the same.

9. A process according to claim 8 including the further step of substantially neutralizing the alkaline sorbitol containing digested complex.

References Cited in the file of this patent

UNITED STATES PATENTS

| | | |
|---|---|---|
| 906,474 | Turner et al. | Dec. 8, 1908 |
| 2,215,233 | Ruskin | Sept. 17, 1940 |
| 2,816,060 | Carter | Dec. 10, 1957 |
| 2,820,740 | London et al. | Jan. 21, 1958 |
| 2,822,317 | Gulesich et al. | Feb. 4, 1958 |

FOREIGN PATENTS

| | | |
|---|---|---|
| 523,236 | Canada | Mar. 27, 1956 |